(No Model.)
J. A. GRIFFITHS.
SAFETY ATTACHMENT FOR VALVES.
No. 583,467. Patented June 1, 1897.
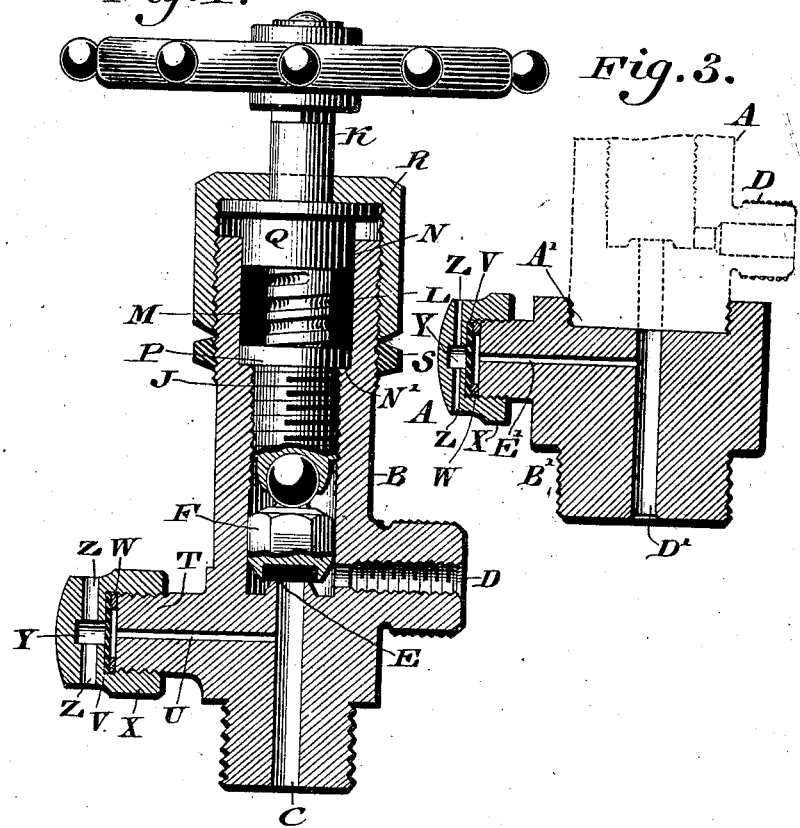
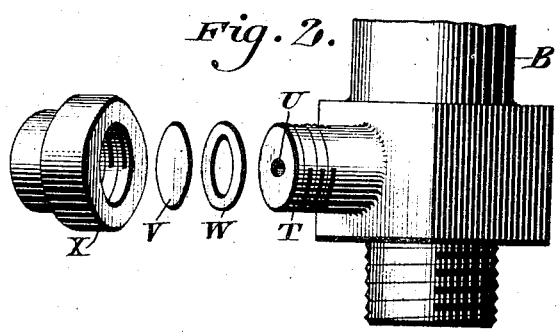
Witnesses
P. H. Nagle.
L. Douville.
Inventor
James A. Griffiths,
By
Attorney

UNITED STATES PATENT OFFICE.

JAMES A. GRIFFITHS, OF PHILADELPHIA, PENNSYLVANIA.

SAFETY ATTACHMENT FOR VALVES.

SPECIFICATION forming part of Letters Patent No. 583,467, dated June 1, 1897.

Application filed May 2, 1895. Serial No. 547,854. (No model.)

*To all whom it may concern:*

Be it known that I, JAMES A. GRIFFITHS, a citizen of the United States, residing in the city and county of Philadelphia, State of Pennsylvania, have invented a new and useful Improvement in Safety Attachments for Valves, which improvement is fully set forth in the following specification and accompanying drawings.

My invention consists of a novel construction of safety attachment for valves which are liable to be subjected to high pressures, provision being made for allowing a suitable plate or diaphragm to burst when a certain maximum degree of pressure has been reached without injuring the valve or its adjuncts.

It also consists of novel means of packing the stem of said valve.

It further consists of novel details of construction, all as will be hereinafter set forth.

Figure 1 represents a vertical sectional view of a safety attachment for a valve embodying my invention. Fig. 2 represents a perspective view of a portion of the body of said valve, showing the safety attachment and its adjuncts removed and the manner of assembling the same. Fig. 3 represents a vertical sectional view showing the safety attachment made separable from the valve.

Similar letters of reference indicate corresponding parts in the several figures.

Referring to the drawings, A designates a valve, the same having the body B, the inlet C, and the outlet D, adjacent to which latter is located the valve-seat E, with which the head or valve F is adapted to contact, the same being suitably connected to the lower threaded portion J of the stem K, which latter is provided with a hand-wheel or similar device.

L designates a helical or spiral groove in that portion of said stem K which is in contact with the packing M of the stuffing-box N, said packing being held in position between a ring or washer P, which abuts against a shoulder N' at the lower portion of said stuffing-box and the gland Q, which latter is held in position by the cap-nut R, through which said stem K passes, said cap-nut being adapted to be in contact at its lower portion with a lock or check nut S, it being evident that said groove L may be a helical or spiral ridge, if desired, its function being the same in either instance.

T designates a threaded boss which is attached to the valve-body B and has a passage U extending therefrom which communicates with the main inlet C, it being noticed that said port U communicates with said inlet always at a point below said valve-seat E, so that the maximum pressure is always in said passage U, whether the valve is open or closed.

V designates a plate or diaphragm, which may be made of copper or other suitable material and which has in contact therewith a ring or washer W, which may be of paper or similar material, said plate and washer being held in position by a cap X, having a threaded portion engaging said boss, and the recess Y therein, from which latter extend at an angle thereto the outlet-ports or vents Z, it being noted that said ports Z are out of alinement with said plate V or passage U, so that it will be impossible for said plate to be readily punctured or destroyed from the exterior by any one tampering with said cap.

It will be noted that by the employment of the washer W in the location and manner described the diaphragm V is caused to be removed a short distance from the end of the boss T, and thus to cause a greater portion of its surface to be exposed to the excess of pressure than if no washer was employed, thereby enabling said diaphragm to be quickly acted upon and burst whenever said excess of pressure is reached.

In Fig. 3 I have shown the safety attachment made separable from the valve, A designating the latter, having the outlet D, as before. The lower portion A' of said valve is threaded and is adapted to engage a similar threaded portion of the plug B', the lower end of the latter being also threaded, said plug having the inlet-passage D', into which leads the passage E', whose outer end is closed by means of the diaphragm V, washer W, and cap X, having therein the recess Y and the ports Z substantially the same as has been described with reference to Fig. 1, the function of the parts being the same in each instance.

The operation is as follows: Whenever the pressure entering the inlet C from the receptacle to which the valve is attached exceeds the safety-point, the plate V will burst whether the valve is open or closed and the extraordinary pressure accumulated within the valve will be relieved, escaping through the recess Y and the ports or vents Z to the atmosphere, thus necessitating the restoration only of the plate V, which, being of inexpensive material, can be readily replaced by removing the cap X, the valve and its adjuncts remaining thus uninjured, as is evident. The helical or spiral groove or ridge in the stem K being tightly in engagement with the packing M will cause an exceedingly effective joint to be made between the stem and the packing and will reduce the liability of leakage to a minimum, it being understood that the extent of movement required to open valves of this character is very slight and that there is therefore no injurious tearing or disintegrating effect produced upon the packing, it having been found in practice that much better effects are attained when the valve-stem is grooved in the manner described than when the stem is of uniform diameter throughout.

By forming the helical or spiral groove L on that portion of the stem K which passes through the packing M there is formed a tighter joint or packing in the box N than would be the case if the stem K were smooth, and when the stem K is rotated this tight joint is not disturbed, but, on the contrary, is kept in the desired condition. When a smooth stem is caused to traverse the packing, the bearing-surface of the packing becomes worn and hardened, thus loosening the connection between the stem and packing. When my improved stem is used, the packing is sufficiently agitated or rubbed to prevent the smoothness and hardness ordinarily occasioned by the rubbing of a polished or smooth stem upon the packing.

Again, by locating the safety-valve with its plate or diaphragm V so that its inlet U is in communication with the inlet C of the main valve below the valve F the maximum pressure on the vessel to which the valve F is attached is always exerted upon the diaphragm U before or at least at the same time the pressure is exerted upon the valve F. Hence it follows that before the excess of pressure can burst the vessel or impair the valve F the weak membrane or diaphragm V will burst. The diaphragm V thus controls the pressure exerted upon the valve F.

Having thus described my invention, what I claim as new, and desire to secure by Letters Patent, is—

1. In a carbonic-acid gas and similar reservoir, a casting provided with a main valve, said casting having inlet and outlet passages therein, and provided with a projection having an inlet-passage communicating with the inlet of said main valve but so located beneath the seat of said valve as to always be unaffected by said valve and a safety-valve comprising a cap having a diaphragm mounted therein and said cap detachably applied to said projection, substantially as and for the purposes described.

2. In a carbonic-acid gas and similar reservoir, a casting provided with a main valve, said casting having inlet and outlet passages at right angles to each other and a projection provided with an internal passage communicating with the inlet of said main valve and a safety-valve attachment, comprising a cap and a diaphragm mounted therein, said safety-valve being so located below the seat of said main valve as to be always unaffected by said valve and said diaphragm normally closing the outlet or recess Y, in communication with ports Z, of said cap, substantially as and for the purposes described.

3. In a valve for carbonic-acid gas and similar reservoirs, a packing-box, a stem having a spirally ridged or grooved portion adapted to traverse said box, and a packing located in said box and closely surrounding said stem, substantially as and for the purposes described.

JAMES A. GRIFFITHS.

Witnesses:
JOHN A. WIEDERSHEIM,
E. H. FAIRBANKS.